United States Patent
Noguchi et al.

(10) Patent No.: US 8,263,698 B2
(45) Date of Patent: Sep. 11, 2012

(54) CARBON NANOFIBER, METHOD FOR PRODUCTION THEREOF, METHOD FOR PRODUCTION OF CARBON FIBER COMPOSITE MATERIAL USING CARBON NANOFIBER, AND CARBON FIBER COMPOSITE MATERIAL

(75) Inventors: Toru Noguchi, Nagano (JP); Hiroyuki Ueki, Nagano (JP); Shigeki Inukai, Nagano (JP); Kenji Takeuchi, Nagano (JP); Satoshi Iinou, Nagano (JP)

(73) Assignees: Nissin Kogyo Co., Ltd., Ueda-shi (JP); Mefs Kabushiki Kaisha, Nagano-shi (JP)

( * ) Notice: Subject to any disclaimer, the term of this patent is extended or adjusted under 35 U.S.C. 154(b) by 0 days.

(21) Appl. No.: 12/937,415

(22) PCT Filed: Apr. 8, 2009

(86) PCT No.: PCT/JP2009/057198
§ 371 (c)(1),
(2), (4) Date: Nov. 16, 2010

(87) PCT Pub. No.: WO2009/128374
PCT Pub. Date: Oct. 22, 2009

(65) Prior Publication Data
US 2011/0060087 A1    Mar. 10, 2011

(30) Foreign Application Priority Data

Apr. 16, 2008 (JP) ................ 2008-106581
Jul. 11, 2008 (JP) ................ 2008-181248

(51) Int. Cl.
C08K 3/04 (2006.01)
C08K 3/00 (2006.01)

(52) U.S. Cl. ................ 524/495; 524/424

(58) Field of Classification Search ........ 524/495
See application file for complete search history.

(56) References Cited

U.S. PATENT DOCUMENTS

| | | | |
|---|---|---|---|
| 4,816,289 A * | 3/1989 | Komatsu et al. ........ 423/447.3 |
| 5,456,897 A | 10/1995 | Moy et al. |
| 5,618,875 A * | 4/1997 | Baker et al. ........ 524/495 |
| 5,698,175 A | 12/1997 | Hiura et al. |
| 6,143,689 A | 11/2000 | Moy et al. |
| 7,438,970 B2 | 10/2008 | Magario et al. |
| 7,501,459 B2 | 3/2009 | Noguchi et al. |
| 7,619,029 B1 | 11/2009 | Noguchi et al. |
| 7,785,701 B2 | 8/2010 | Noguchi et al. |
| 7,927,692 B2 | 4/2011 | Noguchi et al. |
| 2003/0066479 A1 | 4/2003 | Drzal et al. |
| 2004/0241440 A1 | 12/2004 | Noguchi et al. |
| 2005/0002850 A1 | 1/2005 | Niu et al. |
| 2005/0075443 A1 | 4/2005 | Noguchi et al. |
| 2006/0214560 A1 | 9/2006 | Noguchi et al. |
| 2006/0239891 A1 | 10/2006 | Niu et al. |
| 2007/0100058 A1 | 5/2007 | Noguchi et al. |
| 2007/0112124 A1 | 5/2007 | Noguchi et al. |
| 2007/0293848 A1 | 12/2007 | Endo et al. |
| 2008/0102020 A1 | 5/2008 | Niu et al. |
| 2008/0132635 A1 | 6/2008 | Noguchi et al. |
| 2008/0167417 A1 | 7/2008 | Noguchi et al. |
| 2009/0000880 A1 | 1/2009 | Noguchi et al. |
| 2009/0166918 A1 | 7/2009 | Noguchi et al. |
| 2009/0253852 A1 | 10/2009 | Noguchi et al. |
| 2010/0009160 A1 | 1/2010 | Noguchi et al. |
| 2010/0009183 A1 | 1/2010 | Noguchi et al. |
| 2010/0009204 A1 | 1/2010 | Noguchi et al. |

FOREIGN PATENT DOCUMENTS

| | | |
|---|---|---|
| CN | 1535999 A | 10/2004 |
| EP | 1 598 394 A1 | 11/2005 |
| EP | 1 705 211 A2 | 9/2006 |
| EP | 1 466 940 B1 | 9/2009 |
| EP | 2 311 922 A1 | 4/2011 |
| JP | A-61-218661 | 9/1986 |
| JP | A-61-225325 | 10/1986 |
| JP | A-61-225326 | 10/1986 |
| JP | A-02-259120 | 10/1990 |
| JP | A-08-012310 | 1/1996 |
| JP | T-2003-505332 | 2/2003 |
| JP | A-2005-097525 | 4/2005 |
| JP | A-2006-198393 | 8/2006 |
| JP | A-2006-240932 | 9/2006 |
| JP | A-2007-254271 | 10/2007 |
| WO | WO 01/07694 A1 | 2/2001 |
| WO | WO 02/095098 A1 | 11/2002 |
| WO | WO 2007/037260 A1 | 4/2007 |
| WO | WO 2007/099975 A1 | 9/2007 |

OTHER PUBLICATIONS

U.S. Appl. No. 11/475,032, filed Jun. 26, 2006 in the name of Noguchi et al. U.S. Appl. No. 12/647,898, filed Dec. 28, 2009 in the name of Noguchi et al.
U.S. Appl. No. 12/647,943, filed Dec. 28, 2009 in the name of Noguchi et al.
U.S. Appl. No. 12/648,040, filed Dec. 28, 2009 in the name of Noguchi et al.
U.S. Appl. No. 12/647,948, filed Dec. 28, 2009 in the name of Noguchi et al.
U.S. Appl. No. 12/836,305, filed Jul. 14, 2010 in the name of Noguchi et al.
International Search Report issued in Application No. PCT/JP2009/057198; Dated May 19, 2009.
Office Action issued in Chinese Patent Appln. No. 200980113515.X; mailed Jan. 29, 2012.
Office Action issued in Japanese Patent Appln. No. 2008-181248; mailed Feb. 1, 2012.
Database WPI; Week 200671; Thomson Scientific, London, GB; AN 2006-682965; XP002676693; (abstract of JP-A-2006-240932).
Jun. 5, 2012 European Search Report issued in European Patent Application No. 09733163.1.

* cited by examiner

*Primary Examiner* — Hui Chin
(74) *Attorney, Agent, or Firm* — Oliff & Berridge, PLC

(57) ABSTRACT

A method of producing a carbon fiber composite material includes a first step and a second step. The first step includes oxidizing first carbon nanofibers produced by a vapor growth method to obtain second carbon nanofibers having an oxidized surface. The second step includes mixing the second carbon nanofibers into an elastomer, and uniformly dispersing the carbon nanofibers in the elastomer by applying a shear force to obtain the carbon fiber composite material. The second carbon nanofibers obtained by the first step have a surface oxygen concentration measured by X-ray photoelectron spectroscopy (XPS) of 2.6 to 4.6 atm %.

7 Claims, 8 Drawing Sheets

CARBON NANOFIBER, METHOD FOR PRODUCTION THEREOF, METHOD FOR PRODUCTION OF CARBON FIBER COMPOSITE MATERIAL USING CARBON NANOFIBER, AND CARBON FIBER COMPOSITE MATERIAL

TECHNICAL FIELD

The present invention relates to carbon nanofibers, a method of producing carbon nanofibers, a method of producing a carbon fiber composite material using carbon nanofibers, and a carbon fiber composite material.

BACKGROUND ART

It has been difficult to disperse carbon nanofibers (filler) in a matrix. The inventors proposed a method of producing a carbon fiber composite material that uniformly disperses carbon nanofibers in an elastomer by improving the dispersibility of the carbon nanofibers (see JP-A-2005-97525, for example). According to this method, the elastomer and the carbon nanofibers are mixed, so that the dispersibility of the carbon nanofibers with strong aggregating properties is improved due to a shear force. Specifically, when mixing the elastomer and the carbon nanofibers, the viscous elastomer enters the space between the carbon nanofibers while specific portions of the elastomer are bonded to highly active sites of the carbon nanofibers through chemical interaction. When a high shear force is applied to the mixture of the carbon nanofibers and the elastomer having an appropriately long molecular length and a high molecular mobility (exhibiting elasticity), the carbon nanofibers move along with the deformation of the elastomer. The aggregated carbon nanofibers are separated by the restoring force of the elastomer due to its elasticity, and become dispersed in the elastomer. Expensive carbon nanofibers can be efficiently utilized as a filler for a composite material by thus improving the dispersibility of the carbon nanofibers in the matrix.

Carbon nanofibers are industrially mass-produced by a vapor growth method that pyrolyzes a gas such as a hydrocarbon gas in the presence of a metal catalyst. Carbon nanofibers which are mass-produced by the vapor growth method in a heating furnace at about 1000° C. and further graphitized by heating at a higher temperature have been known (see JP-A-2006-198393, for example). The carbon nanofibers thus graphitized have a surface with a small number of defects. However, such carbon nanofibers exhibit poor wettability with matrix material (e.g., elastomer).

SUMMARY OF THE INVENTION

Technical Problem

An object of the invention is to provide carbon nanofibers, a method of producing carbon nanofibers, a method of producing a carbon fiber composite material using carbon nanofibers, and a carbon fiber composite material.

Solution to Problem

According to the invention, there is provided carbon nanofibers obtained by oxidizing first carbon nanofibers produced by a vapor growth method, the carbon nanofibers having a surface oxygen concentration measured by X-ray photoelectron spectroscopy (XPS) of 2.6 to 4.6 atm %.

Since the surface of the carbon nanofibers has been moderately oxidized, the carbon nanofibers exhibit improved surface reactivity with another material (e.g., a matrix material of a composite material), so that the carbon nanofibers exhibit improved wettability with the matrix material. The rigidity and the flexibility of a composite material can be improved by utilizing the carbon nanofibers that exhibit improved wettability.

The above carbon nanofibers may have a ratio (D/G) of a peak intensity D at around 1300 $cm^{-1}$ to a peak intensity G at around 1600 $cm^{-1}$ measured by Raman scattering spectroscopy of 0.12 to 0.22.

The above carbon nanofibers may have a specific surface area by nitrogen adsorption of 34 to 58 $m^2/g$.

The above carbon nanofibers may have an average diameter of 4 to 230 nm.

According to the invention, there is provided a method of producing carbon nanofibers including oxidizing first carbon nanofibers produced by a vapor growth method to obtain second carbon nanofibers, a surface oxygen concentration of the second carbon nanofibers measured by X-ray photoelectron spectroscopy (XPS) being higher than that of the first carbon nanofibers by 0.5 to 2.6 atm %.

According to the above method of producing carbon nanofibers, since the surface of the second carbon nanofibers has been moderately oxidized, the second carbon nanofibers exhibit improved surface reactivity with another material (e.g., a matrix material of a composite material), so that the carbon nanofibers exhibit improved wettability with the matrix material.

According to the invention, there is provided a method of producing carbon nanofibers including oxidizing first carbon nanofibers produced by a vapor growth method to obtain second carbon nanofibers, a surface oxygen concentration of the second carbon nanofibers measured by X-ray photoelectron spectroscopy (XPS) being higher than that of the first carbon nanofibers by 20 to 120%.

According to the above method of producing carbon nanofibers, since the surface of the second carbon nanofibers has been moderately oxidized, the second carbon nanofibers exhibit improved surface reactivity with another material (e.g., a matrix material of a composite material), so that the carbon nanofibers exhibit improved wettability with the matrix material.

The above method of producing carbon nanofibers may include heating the first carbon nanofibers at 600 to 800° C. in an oxygen-containing atmosphere.

The above method of producing carbon nanofibers may include reducing the mass of the first carbon nanofibers by 2 to 20% to obtain the second carbon nanofibers.

In the above method of producing carbon nanofibers, the second carbon nanofibers obtained by oxidizing the first carbon nanofibers may have a surface oxygen concentration measured by X-ray photoelectron spectroscopy (XPS) of 2.6 to 4.6 atm %.

In the above method of producing carbon nanofibers, the second carbon nanofibers obtained by oxidizing the first carbon nanofibers may have a ratio (D/G) of a peak intensity D at around 1300 $cm^{-1}$ to a peak intensity G at around 1600 $cm^{-1}$ measured by Raman scattering spectroscopy of 0.12 to 0.22.

In the above method of producing carbon nanofibers, the second carbon nanofibers obtained by oxidizing the first carbon nanofibers may have a specific surface area by nitrogen adsorption of 34 to 58 $m^2/g$.

In the above method of producing carbon nanofibers, the second carbon nanofibers obtained by oxidizing the first carbon nanofibers may have an average diameter of 4 to 230 nm.

According to the invention, there is provided a method of producing a carbon fiber composite material including a first step that includes oxidizing first carbon nanofibers produced by a vapor growth method to obtain second carbon nanofibers having an oxidized surface, and a second step that includes mixing the second carbon nanofibers into an elastomer, and uniformly dispersing the second carbon nanofibers in the elastomer by applying a shear force to obtain a carbon fiber composite material, the second carbon nanofibers obtained by the first step having a surface oxygen concentration measured by X-ray photoelectron spectroscopy (XPS) of 2.6 to 4.6 atm %.

According to the above method of producing a carbon fiber composite material, since the surface of the second carbon nanofibers has been moderately oxidized, the second carbon nanofibers exhibit improved surface reactivity with the elastomer (matrix), so that the wettability of the second carbon nanofibers with the elastomer is improved. A carbon fiber composite material that exhibits improved rigidity and flexibility can be produced by utilizing the second carbon nanofibers that exhibit improved wettability with the elastomer. In particular, the carbon fiber composite material thus produced exhibits improved rigidity at a high temperature.

In the above method of producing a carbon fiber composite material, the first step may be performed so that the surface oxygen concentration of the second carbon nanofibers measured by X-ray photoelectron spectroscopy (XPS) is higher than that of the first carbon nanofibers by 0.5 to 2.6 atm %.

In the above method of producing a carbon fiber composite material, the first step may be performed so that the surface oxygen concentration of the second carbon nanofibers measured by X-ray photoelectron spectroscopy (XPS) is higher than that of the first carbon nanofibers by 20 to 120%.

In the above method of producing a carbon fiber composite material, the first step may include heating the first carbon nanofibers at 600 to 800° C. in an oxygen-containing atmosphere.

In the above method of producing a carbon fiber composite material, the first step may include reducing the mass of the first carbon nanofibers by 2 to 20% to obtain the second carbon nanofibers.

In the above method of producing a carbon fiber composite material, the second carbon nanofibers may have a ratio (D/G) of a peak intensity D at around 1300 $cm^{-1}$ to a peak intensity G at around 1600 $cm^{-1}$ measured by Raman scattering spectroscopy of 0.12 to 0.22.

In the above method of producing a carbon fiber composite material, the second carbon nanofibers may have a specific surface area by nitrogen adsorption of 34 to 58 $m^2/g$.

In the above method of producing a carbon fiber composite material, the second carbon nanofibers may have an average diameter of 4 to 250 nm.

According to the invention, there is provided a carbon fiber composite material produced by the above method of producing a carbon fiber composite material.

According to the invention, there is provided a carbon fiber composite material including an elastomer, and carbon nanofibers having a surface oxygen concentration measured by X-ray photoelectron spectroscopy (XPS) of 2.6 to 4.6 atm %.

According to the above carbon fiber composite material, since the surface of the carbon nanofibers has been moderately oxidized, the carbon nanofibers exhibit improved surface reactivity with the elastomer (matrix), so that the carbon nanofibers exhibit improved wettability with the elastomer. A carbon fiber composite material including the carbon nanofibers that exhibit improved wettability with the elastomer exhibits improved rigidity and flexibility. In particular, the carbon fiber composite material exhibits improved rigidity at a high temperature.

In the above carbon fiber composite material, the carbon nanofibers may have a ratio (D/G) of a peak intensity D at around 1300 $cm^{-1}$ to a peak intensity G at around 1600 $cm^{-1}$ measured by Raman scattering spectroscopy of 0.12 to 0.22.

In the above carbon fiber composite material, the second carbon nanofibers may have a specific surface area by nitrogen adsorption of 34 to 58 $m^2/g$.

DESCRIPTION OF EMBODIMENTS

Figure 1A:
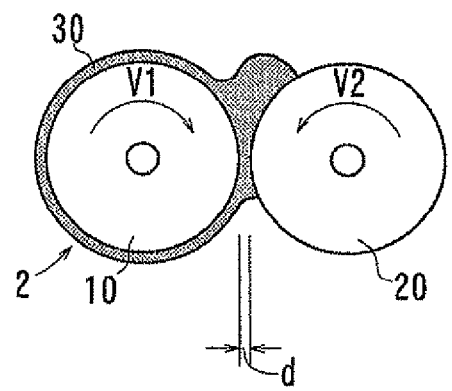
FIG. 1A is a diagram schematically illustrating a method of producing a carbon fiber composite material using an open-roll method.

Embodiments of the invention are described in detail below.

First carbon nanofibers according to one embodiment of the invention are obtained by oxidizing carbon nanofibers produced by a vapor growth method, and have a surface oxygen concentration measured by X-ray photoelectron spectroscopy (XPS) of 2.6 to 4.6 atm %.

A method of producing carbon nanofibers according to one embodiment of the invention includes oxidizing first carbon nanofibers produced by a vapor growth method to obtain second carbon nanofibers, a surface oxygen concentration of the second carbon nanofibers measured by X-ray photoelectron spectroscopy (XPS) being higher than that of the first carbon nanofibers by 0.5 to 2.6 atm %.

A method of producing carbon nanofibers according to one embodiment of the invention includes oxidizing first carbon nanofibers produced by a vapor growth method to obtain second carbon nanofibers, a surface oxygen concentration of the second carbon nanofibers measured by X-ray photoelectron spectroscopy (XPS) being higher than that of the first carbon nanofibers by 20 to 120%.

A method of producing a carbon fiber composite material according to one embodiment of the invention includes a first step that includes oxidizing first carbon nanofibers produced by a vapor growth method to obtain second carbon nanofibers having an oxidized surface, and a second step that includes mixing the second carbon nanofibers into an elastomer, and uniformly dispersing the second carbon nanofibers in the elastomer by applying a shear force to obtain a carbon fiber composite material, the second carbon nanofibers obtained by the first step having a surface oxygen concentration measured by X-ray photoelectron spectroscopy (XPS) of 2.6 to 4.6 atm %.

A carbon fiber composite material according to one embodiment of the invention is produced by the above method of producing a carbon fiber composite material.

A carbon fiber composite material according to one embodiment of the invention includes an elastomer, and carbon nanofibers having a surface oxygen concentration measured by X-ray photoelectron spectroscopy (XPS) of 2.6 to 4.6 atm %.

(I) First Carbon Nanofibers

The first carbon nanofibers used in the method of producing a carbon fiber composite material are described below.

The first carbon nanofibers are produced by a vapor growth method. The vapor growth method includes pyrolyzing a gas such as a hydrocarbon gas in the presence of a metal catalyst to produce the first carbon nanofibers. As the vapor growth method, a method that introduces an organic compound (e.g., benzene or toluene) (i.e., raw material) and an organotransition metal compound (e.g., ferrocene or nickelocene) (i.e., metal catalyst) into a reaction furnace set at a high temperature (e.g., 400 to 1000° C.) together with a carrier gas to produce the first carbon nanofibers on a substrate, a method that produces the first carbon nanofibers in a floating state, a method that causes the first carbon nanofibers to be grown on the wall of the reaction furnace, or the like may be used. Alternatively, metal-containing particles supported on a fire-resistant support (e.g., alumina or carbon) may be caused to come in contact with a carbon-containing compound at a high temperature to obtain the first carbon nanofibers having a diameter of 70 nm or less. The first carbon nanofibers produced by the vapor growth method preferably have an average diameter of 4 to 250 nm. The first carbon nanofibers may be referred to as untreated carbon nanofibers since the surface thereof is not oxidized. It is preferable to improve the dispersibility of the first carbon nanofibers by oxidizing the surface of the first carbon nanofibers.

The first carbon nanofibers produced by the vapor growth method may be heated at 2000 to 3200° C. in an inert gas atmosphere before oxidizing the first carbon nanofibers. The heating temperature is more preferably 2500 to 3200° C., and particularly preferably 2800 to 3200° C. If the heating temperature is 2000° C. or more, impurities such as amorphous products deposited on the surface of the first carbon nanofibers during vapor growth and the residual metal catalyst can be removed. If the heating temperature is 2500° C. or more, the skeleton of the first carbon nanofibers is graphitized (crystallized), so that the number of defects of the first carbon nanofibers decreases. As a result, the first carbon nanofibers exhibit improved strength. If the heating temperature is 3200° C. or less, breakage of the graphite skeleton due to graphite sublimation rarely occurs. The first carbon nanofibers thus graphitized exhibit excellent strength, thermal conductivity, electrical conductivity, and the like as a result of graphitization.

Examples of the first carbon nanofibers include a carbon nanotube and the like. The carbon nanotube has a structure in which a graphite hexagonal carbon layer is rolled in one or more layers. A carbon material having a partial carbon nanotube structure may also be used. The carbon nanotube may also be referred to as a graphite fibril nanotube or a vapor-grown carbon fiber.

(II) Second Carbon Nanofibers

The second carbon nanofibers obtained by the first step of the method of producing a carbon fiber composite material are described below.

The second carbon nanofibers are obtained by oxidizing (surface-oxidizing) the first carbon nanofibers produced by the vapor growth method. The oxidization treatment is described later in connection with the method of producing a carbon fiber composite material. The surface oxygen concentration of the second carbon nanofibers determined by X-ray photoelectron spectroscopy (XPS) is 2.6 to 4.6 atm %, preferably 3.0 to 4.0 atm %, and more preferably 3.1 to 3.7 atm %. Specifically, since the second carbon nanofibers have a moderately oxidized surface, the surface reactivity of the second carbon nanofibers with the elastomer is improved, so that the dispersibility of the second carbon nanofibers in the elastomer can be improved. The second carbon nanofibers may have a mass lower than that of the first carbon nanofibers by 2 to 20%. The second carbon nanofibers preferably have a ratio (D/G) of a peak intensity D at around 1300 $cm^{-1}$ to a peak intensity G at around 1600 $cm^{-1}$ measured by Raman scattering spectroscopy of 0.12 to 0.22. The second carbon nanofibers preferably have a specific surface area by nitrogen adsorption of 34 to 58 $m^2/g$. The second carbon nanofibers preferably have an average diameter of 4 to 230 nm, more preferably 20 to 200 nm, and particularly preferably 60 to 150 nm. If the diameter of the second carbon nanofibers is 4 nm or more, the second carbon nanofibers exhibit improved dispersibility in the matrix resin. If the diameter of the second carbon nanofibers is 230 nm or less, the flatness of the surface of the matrix resin is rarely impaired. If the average diameter of the second carbon nanofibers is 60 nm or more, excellent dispersibility and surface flatness can be achieved. If the average diameter of the second carbon nanofibers is 150 nm or less, the number of carbon nanofibers increases by adding only a small amount of carbon nanofibers, so that the performance of the resulting carbon fiber composite material can be improved. This makes it possible to use only a small amount of expensive first carbon nanofibers to obtain the second carbon nanofibers. The second carbon nanofibers preferably have an aspect ratio of 50 to 200.

Since the surface of the second carbon nanofibers has been moderately oxidized, the second carbon nanofibers exhibit improved surface reactivity with another material (e.g., a matrix material of a composite material), so that the carbon nanofibers exhibit improved wettability with the matrix material. The rigidity and the flexibility of the composite material can be improved by utilizing the carbon nanofibers that exhibit improved wettability. In particular, wettability of the second carbon nanofibers with the matrix material can be improved by moderately oxidizing the surface of the graphitized first carbon nanofibers with relatively low reactivity, so that dispersibility can be improved. Therefore, equivalent properties can be obtained by adding a small amount of second carbon nanofibers.

(III) Elastomer

The elastomer used in the method of producing a carbon fiber composite material is described below.

The elastomer preferably has a molecular weight of 5000 to 5,000,000, and more preferably 20,000 to 3,000,000. If the molecular weight of the elastomer is within the above range, the elastomer molecules are entangled and linked. Therefore, the elastomer exhibits excellent elasticity for dispersing the second carbon nanofibers. Since the elastomer has viscosity, the elastomer easily enters the space between the aggregated second carbon nanofibers. Since the elastomer has elasticity, the second carbon nanofibers can be separated.

The network component of the elastomer in uncrosslinked form preferably has a spin-spin relaxation time (T2n/30° C.), measured for $^1$H at 30° C. by a Hahn-echo method using a pulsed nuclear magnetic resonance (NMR) technique, of 100 to 3000 microseconds, and more preferably 200 to 1000 microseconds. If the elastomer has a spin-spin relaxation time (T2n/30° C.) within the above range, the elastomer is flexible and has sufficiently high molecular mobility (i.e., has elasticity sufficient to disperse the second carbon nanofibers). Since the elastomer has viscosity, the elastomer can easily enter the space between the second carbon nanofibers due to high molecular motion when mixing the elastomer and the second carbon nanofibers.

The network component of the elastomer in a crosslinked form preferably has a spin-spin relaxation time (T2n), measured for $^1$H at 30° C. by the Hahn-echo method using the pulsed NMR technique, of 100 to 2000 microseconds. The reasons therefor are the same as described for the uncrosslinked form. Specifically, when crosslinking the elastomer in uncrosslinked form that satisfies the above requirements, the spin-spin relaxation time (T2n) of the resulting elastomer in crosslinked form almost falls within the above range.

The spin-spin relaxation time determined by the Hahn-echo method using the pulsed NMR technique is a measure that indicates the molecular mobility of a material. Specifically, when measuring the spin-spin relaxation time of the elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as a terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method using the pulsed NMR technique, a solid-echo method, a Carr-Purcell-Meiboom-Gill (CPMG) method, or a 90-degree pulse method may be used instead of the Hahn-echo method. Since the elastomer according to the invention has a medium spin-spin relaxation time (T2), the Hahn-echo method is most suitable. The solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, the side chain, and the terminal chain of the elastomer includes an unsaturated bond or a group having affinity to the second carbon nanofiber, particularly to a terminal radical of the second carbon nanofiber, or the elastomer has properties of readily producing such a radical or group. The unsaturated bond or group may be at least one unsaturated bond or group selected from a double bond, a triple bond, and functional groups such as a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

Since at least one of the main chain, the side chain, and the terminal chain of the elastomer includes an unsaturated bond or a group having high affinity (reactivity or polarity) to the radical of the second carbon nanofiber, the elastomer and the second carbon nanofiber can be bonded. This makes it possible to easily disperse the second carbon nanofibers against cohesive force. When mixing the elastomer and the second carbon nanofibers, free radicals are produced by breakage of the elastomer molecules, and attack a defect of the second carbon nanofibers to produce radicals on the surface of the second carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (DR), chlorobutyl rubber (CDR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyimide-based elastomer (TPEA), or a styrene-based elastomer (SBS), or a mixture of these elastomers may be used. It is particularly preferable to use a highly polar elastomer that readily produces free radicals when mixing the elastomer, such as natural rubber (NR) or nitrile rubber (NBR). An elastomer having a low polarity (e.g., ethylene-propylene rubber (EPDM)) may also be used in the invention, since such an elastomer also produces free radicals when the mixing temperature is adjusted to a relatively high temperature (e.g., 50° C. to 150° C. for EPDM).

A rubber elastomer or a thermoplastic elastomer may be used as the elastomer. When using a rubber elastomer, the elastomer may be in crosslinked form or uncrosslinked form (preferably uncrosslinked form).

(IV) Method of Producing Carbon Fiber Composite Material

The method of producing a carbon fiber composite material includes the first step and the second step.

First Step

The first step is described below. The first step includes oxidizing first carbon nanofibers produced by the vapor growth method to obtain second carbon nanofibers having an oxidized surface. The first step may be performed so that the surface oxygen concentration of the second carbon nanofibers measured by X-ray photoelectron spectroscopy (XPS) is higher than that of the first carbon nanofibers by 0.5 to 2.6 atm %. The surface oxygen concentration of the second carbon nanofibers measured by X-ray photoelectron spectroscopy (XPS) is preferably higher than that of the first carbon nanofibers by 0.9 to 1.9 atm %, and more preferably 1.0 to 1.6 atm %. The first step may be performed so that the surface oxygen concentration of the second carbon nanofibers measured by X-ray photoelectron spectroscopy (XPS) is higher than that of the first carbon nanofibers by 20 to 120%. The surface oxygen concentration of the second carbon nanofibers measured by X-ray photoelectron spectroscopy (XPS) is preferably higher than that of the first carbon nanofibers by 43 to 90%, and more preferably 48 to 76%. The surface oxygen concentration of the second carbon nanofibers obtained by the first step, determined by X-ray photoelectron spectroscopy (XPS), is 2.6 to 4.6 atm %, preferably 3.0 to 4.0 atm %, and more preferably 3.1 to 3.7 atm %. The second carbon nanofibers are preferably oxidized so that the surface oxygen concentration of the second carbon nanofibers is higher than that of the first carbon nanofibers by 0.2 atm % or more. Specifically, since the second carbon nanofibers have a moderately oxidized surface, the surface reactivity of the second carbon nanofibers with the elastomer is improved, so that the dispersibility of the carbon nanofibers in the elastomer can be improved. The first step may include heating the first carbon nanofibers at 600 to 800° C. in an oxygen-containing atmosphere. For example, the first carbon nanofibers are placed in a furnace containing air, and heated at a given temperature within the range of 600 to 800° C. to obtain second carbon nanofibers having a surface that has been oxidized at a desired oxygen concentration. The heat treatment time of the first step (i.e., the period of time in which the first carbon nanofibers are held in the furnace at a given temperature) may be 10 to 180 minutes, for example. The oxygen-containing atmosphere may be an ambient atmosphere, an oxygen atmosphere, or an atmosphere for which the oxygen concentration is appropriately adjusted. It suffices that the atmosphere have an oxygen concentration sufficient for the surface of the second carbon nanofibers to be oxidized by the first step to the desired oxygen concentration. The heating temperature may be appropriately set within the range of 600 to 800° C. so that the desired oxidation treatment is achieved. The first carbon nanofibers may be normally burnt at about 800° C., and damaged to a large extent. Therefore, it is desirable to carefully set the heating temperature and the heating time through repeated experiments. Note that the heating temperature and the heating time may be appropriately adjusted depending on the oxygen concentration of the furnace used for the first step, the internal volume of the furnace, the amount of first carbon nanofibers subjected to the oxidation treatment, and the like. The second carbon nanofibers obtained by the first step preferably have a mass lower than that of the first carbon nanofibers by 2 to 20%, for example. If the reduction in mass is within the above range, the second carbon nanofibers have been moderately oxidized. If the second carbon nanofibers have a mass lower than that of the first carbon nanofibers by less than 2%, the surface oxygen concentration of the second carbon nanofibers is so low that an improvement in wettability may not be obtained. When the mass of the second carbon nanofibers has been reduced as compared with the first carbon nanofibers by more than 20%, the second carbon nanofibers exhibit almost the same wettability as that of the second carbon nanofibers that have been reduced in mass by 20% or less (i.e., the carbon nanofibers are unnecessarily lost). Moreover, it may be uneconomical with respect to the energy consumption of the heat treatment. Specifically, when the surface of the first carbon nanofibers is oxidized, carbon that forms the surface of the first carbon nanofibers is vaporized as carbon dioxide. It is considered that the fiber length of the carbon nanofibers is reduced to only a small extent when the second carbon nanofibers are not reduced in mass as compared with the first carbon nanofibers by more than 20%. The surface oxygen concentration of the second carbon nanofibers may be analyzed by X-ray photoelectron spectroscopy (XPS). The oxygen concentration is preferably analyzed by XPS after subjecting the second carbon nanofibers to an argon gas etching treatment for 0.5 to 1.0 minutes so that impurities adhering to the surface of the second carbon nanofibers are removed (i.e., the surface of the second carbon nanofibers is exposed), for example. The argon gas concentration employed in the argon gas etching treatment is preferably $5 \times 10^{-2}$ to $20 \times 10^{-2}$ Pa. The surface oxygen concentration is preferably analyzed by XPS after bonding a carbon tape (i.e., conductive adhesive) to a metal stage of an XPS apparatus, sprinkling the second carbon nanofibers over the carbon tape so that the second carbon nanofibers adhere to the carbon tape, and removing the second carbon nanofibers that do not adhere to the carbon tape, for example. Specifically, the surface oxygen concentration of the second carbon nanofibers is preferably analyzed by XPS while allowing the second carbon nanofibers to be in a powdery state without pressing the second carbon nanofibers on the carbon tape to have a block-like form.

The second carbon nanofibers obtained by the first step preferably have a ratio (D/G) of a peak intensity D at around 1300 cm$^{-1}$ to a peak intensity G at around 1600 cm$^{-1}$ measured by Raman scattering spectroscopy of 0.12 to 0.22. The second carbon nanofibers have a Raman peak ratio (D/G) larger than that of the first carbon nanofibers due to an increase in the number of crystal defects of the surface of the second carbon nanofibers. The second carbon nanofibers are preferably oxidized so that the second carbon nanofibers have a Raman peak ratio (D/G) larger than that of the first carbon nanofibers by 0.02 or more. The second carbon nanofibers preferably have a specific surface area by nitrogen adsorption of 34 to 58 m$^2$/g. The specific surface area by nitrogen adsorption of the second carbon nanofibers is larger than that of the first carbon nanofibers due to surface roughness. The second carbon nanofibers are preferably oxidized so that the second carbon nanofibers have a specific surface area by nitrogen adsorption larger than that of the first carbon nanofibers by 9 m$^2$/g or more. The average diameter of the first carbon nanofibers used in the first step is preferably 4 to 250 nm. The average diameter of the second carbon nanofibers obtained by the first step may be 4 to 230 nm. The second carbon nanofibers having the above properties exhibit improved surface reactivity and wettability with the elastomer.

The amount of the second carbon nanofibers mixed into the elastomer may be adjusted depending on the application. Since the wettability of the second carbon nanofibers with the elastomer has been improved, the amount of the second carbon nanofibers can be reduced when producing a carbon fiber composite material having a given rigidity, for example. A crosslinked elastomer or an uncrosslinked elastomer may be used as the elastomer material for the carbon fiber composite material. The carbon fiber composite material may be used as a raw material for a metal or resin composite material. The carbon fiber composite material as a raw material for a metal or resin composite material may be used as a masterbatch (i.e., carbon nanofiber source) when mixing the carbon nanofibers into a metal or a resin.

Second Step

The second step includes mixing the second carbon nanofibers obtained by the first step into the elastomer, and uniformly dispersing the second carbon nanofibers in the elastomer by applying a shear force to obtain a carbon fiber composite material. The second step is described in detail below with reference to FIGS. 1A to 1C.

Figure 1B:
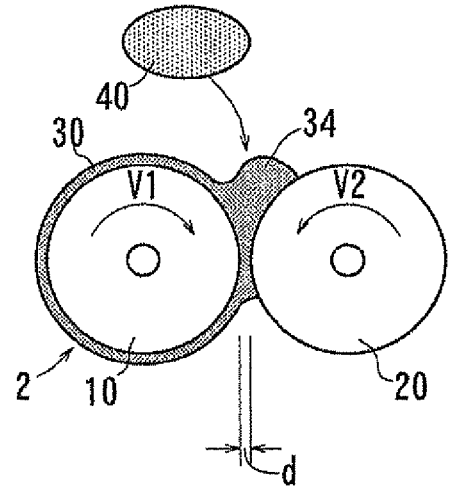
FIG. 1B is a diagram schematically illustrating a method of producing a carbon fiber composite material using an open-roll method.
Figure 1C:
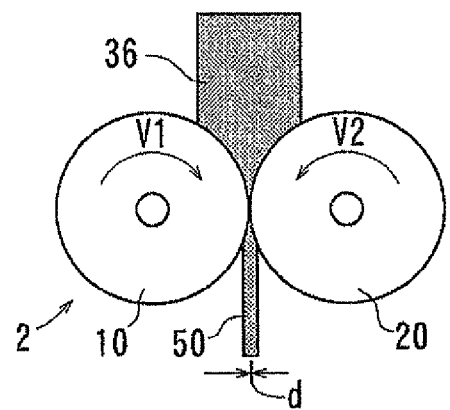
FIG. 1C is a diagram schematically illustrating a method of producing a carbon fiber composite material using an open-roll method.

FIGS. 1A to 1C are diagrams schematically illustrating a method of producing a carbon fiber composite material using an open-roll method. The network component of the elastomer (raw material) in uncrosslinked form preferably has a spin-spin relaxation time (T$2n$), measured for $^1$H at 150° C. by the Hahn-echo method using the pulsed NMR technique, of 100 to 3000 microseconds. As shown in FIGS. 1A to 1C, a first roll 10 and a second roll 20 of a two-roll open roll 2 are disposed at a predetermined distance d (e.g., 0.5 to 1.5 mm). The first roll 10 and the second roll 20 are respectively rotated at rotation speeds V1 and V2 in the directions indicated by arrows in FIGS. 1A to 1C or in the reverse directions. As shown in FIG. 1A, an elastomer 30 that is wound around the first roll 10 is masticated so that the molecular chains of the elastomer are moderately cut to produce free radicals. Since the surface of the second carbon nanofibers has been moderately activated by oxidation, radicals and functional groups are easily produced, so that free radicals of the elastomer produced by mastication are easily bonded to the second carbon nanofibers.

As shown in FIG. 1B, second carbon nanofibers 40 are supplied to a bank 34 of the elastomer 30 wound around the first roll 10, and the elastomer 30 and the second carbon nanofibers 40 are mixed. The elastomer 30 and the second carbon nanofibers 40 may be mixed using an internal mixing method, a multi-screw extrusion kneading method, or the like instead of the open-roll method.

As shown in FIG. 1C, the distance d between the first roll 10 and the second roll 20 may be set to 0.5 mm or less, and preferably 0 to 0.5 mm. A mixture 36 is then supplied to the open roll 2, and tight-milled one or more times. The mixture is preferably tight-milled about one to ten times, for example. When the surface velocity of the first roll 10 is referred to as V1 and the surface velocity of the second roll 20 is referred to as V2, the surface velocity ratio (V1/V2) of the first roll 10 to the second roll 20 during tight milling is preferably set at 1.05 to 3.00, and more preferably 1.05 to 1.2, A desired shear force can be applied by utilizing such a surface velocity ratio. A carbon fiber composite material 50 obtained by tight milling is sheeted by the rolls. In the tight milling step, the elastomer 30 is preferably tight-milled while setting the roll temperature at a relatively low temperature (preferably 0 to 50° C., and more preferably 5 to 30° C.) in order to obtain as high a shear force as possible. The temperature of the elastomer 30 measured is preferably adjusted to 0 to 50° C. This causes a high shear force to be applied to the elastomer 30 so that the aggregated second carbon nanofibers 40 are separated by the molecules of the elastomer 30 one by one, and become dispersed in the elastomer 30. In particular, since the elastomer 30 has elasticity, viscosity, and chemical interaction with the second carbon nanofibers 40, the second carbon nanofibers 40 are easily dispersed in the elastomer 30. A carbon fiber composite material 50 in which the second carbon nanofibers 40 exhibit excellent dispersibility and dispersion stability (i.e., the second carbon nanofibers 40 rarely re-aggregate) can thus be obtained.

Specifically, when mixing the elastomer and the second carbon nanofibers using the open roll, the viscous elastomer enters the space between the second carbon nanofibers, and specific portions of the elastomer are bonded to highly active sites of the second carbon nanofibers through chemical interaction. Since the second carbon nanofibers have a moderately active surface obtained by oxidation, the second carbon nanofibers are easily bonded to the molecules of the elastomer. When a high shear force is then applied to the elastomer, the second carbon nanofibers move along with the movement of the molecules of the elastomer, so that the aggregated second carbon nanofibers are separated by the restoring force of the elastomer due to elasticity after shearing, and become dispersed in the elastomer. According to this embodiment, when the carbon fiber composite material is extruded through the narrow space between the rolls, the carbon fiber composite material is deformed to a thickness greater than the roll distance as a result of the restoring force of the elastomer due to its elasticity. It is considered that the deformation causes the carbon fiber composite material to which a high shear force is applied to flow in a more complicated manner, so that the second carbon nanofibers are dispersed in the elastomer. The second carbon nanofibers that have been dispersed in the elastomer are prevented from re-aggregating due to chemical interaction with the elastomer, so that excellent dispersion stability can be obtained.

The second carbon nanofibers may be dispersed in the elastomer by applying a shear force using an internal mixing method or a multi-screw extrusion kneading method instead of the open-roll method. It suffices that a shear force sufficient to separate the aggregated second carbon nanofibers be applied to the elastomer. It is preferable to use the open-roll method because the actual temperature of the mixture can be measured and managed while managing the roll temperature.

A crosslinking agent may be mixed into the carbon fiber composite material which has been tight-milled and sheeted, and the carbon fiber composite material may be crosslinked to obtain a crosslinked carbon fiber composite material. Note that the carbon fiber composite material may be molded without crosslinking the carbon fiber composite material. The carbon fiber composite material obtained by the second step may be used in the form of a sheet obtained by the open roll method, or may be formed into a desired shape (e.g., sheet) using a rubber molding method such as injection molding, transfer molding, press molding, extrusion molding, or calendering.

In the method of producing a carbon fiber composite material according to this embodiment, a compounding ingredient usually used when processing an elastomer may be added. A known compounding ingredient may be used. Examples of the compounding ingredient include a crosslinking agent, a vulcanizing agent, a vulcanization accelerator, a vulcanization retarder, a softener, a plasticizer, a curing agent, a reinforcing agent, a filler, an aging preventive, a colorant, and the like. These compounding ingredients may be added to the elastomer before supplying the second carbon nanofibers to the open roll, for example.

In the method of producing a carbon fiber composite material according to this embodiment, the second carbon nanofibers are directly mixed into the elastomer having rubber elasticity. Note that the following method may also be employed. Specifically, the elastomer is masticated before mixing the second carbon nanofibers into the elastomer to reduce the molecular weight of the elastomer. Since the viscosity of the elastomer decreases when the molecular weight of the elastomer has decreased due to mastication, the elastomer easily enters the space between the aggregated second carbon nanofibers. The raw material elastomer is a rubber elastic body of which the network component in uncrosslinked form has a first spin-spin relaxation time (T2n), measured for $^1$H at 30° C. by the Hahn-echo method using the pulsed NMR technique, of 100 to 3000 microseconds. The raw material elastomer is masticated to reduce the molecular weight of the elastomer to obtain a liquid elastomer having a first spin-spin relaxation time (T2n) of more than 3000 microseconds. The first spin-spin relaxation time (T2n) of the liquid elastomer after mastication is preferably longer than the first spin-spin relaxation time (T2n) of the raw material elastomer before mastication by a factor of 5 to 30. The above mastication is performed until the elastomer is liquefied (i.e., until the elastomer exhibits fluidity which is not suitable for mixing) by cutting the molecules of the elastomer by applying a high shear force using the open-roll method or the like to reduce the molecular weight of the elastomer to a large extent, differing from normal mastication performed in a state in which the elastomer is solid. For example, when using the open-roll method, the elastomer is masticated at a roll temperature of 20° C. (minimum mastication time: 60 minutes) to 150° C. (minimum mastication time: 10 minutes). The roll distance d is set to 0.5 to 1.0 mm, for example. The second carbon nanofibers are then supplied to the liquid elastomer obtained by mastication. However, since the elasticity of the liquid elastomer has been reduced to a large extent, the aggregated second carbon nanofibers are dispersed to only a small extent even if the elastomer and the second carbon nanofibers are mixed in a state in which free radicals of the elastomer are bonded to the second carbon nanofibers.

Therefore, the molecular weight of the elastomer in the mixture obtained by mixing the liquid elastomer and the second carbon nanofibers is increased so that the elastomer recovers its elasticity to obtain a mixture that contains the rubber elastic body, and the second carbon nanofibers are uniformly dispersed in the elastomer by tight milling using the open-roll method or the like. The mixture that contains the elastomer having an increased molecular weight is a rubber elastic body of which the network component has a first spin-spin relaxation time ($T2n$), measured for $^1H$ at 30° C. by the Hahn-echo method using the pulsed NMR technique, of 3000 microseconds or less. The first spin-spin relaxation time ($T2n$) of the rubber elastic body mixture in which the molecular weight of the elastomer has been increased is preferably higher than the first spin-spin relaxation time ($T2n$) of the raw material elastomer before mastication by a factor of 0.5 to 10. The elasticity of the rubber elastic mixture may be expressed by the molecular form (which may be observed from the molecular weight) or the molecular mobility (which may be observed from the first spin-spin relaxation time ($T2n$)) of the elastomer. The molecular weight of the elastomer is preferably increased by heating the mixture in a heating furnace at 40 to 100° C. for 10 to 100 hours, for example. This causes the molecular chain of the elastomer to extend due to bonding between free radicals of the elastomer in the mixture so that the molecular weight of the elastomer increases. The molecular weight of the elastomer may be increased in a short period of time by mixing a small amount (e.g., ½ or less of a normal amount) of a crosslinking agent into the mixture and heating (e.g., annealing) the mixture to effect a crosslinking reaction. When increasing the molecular weight of the elastomer by a crosslinking reaction, it is preferable to set the amount of crosslinking agent, the heating time, and the heating temperature so that mixing in the subsequent step is not hindered.

According to this method of producing a carbon fiber composite material, the second carbon nanofibers can be more uniformly dispersed in the elastomer by reducing the viscosity of the elastomer before mixing the second carbon nanofibers into the elastomer. Specifically, the liquid elastomer having a reduced molecular weight easily enters the space between the aggregated second carbon nanofibers as compared with the case of mixing the second carbon nanofibers into the elastomer having a high molecular weight, so that the second carbon nanofibers can be more uniformly dispersed in the tight milling step. Since a large number of free radicals of the elastomer produced by breakage of the molecules of the elastomer can be strongly bonded to the surface of the second carbon nanofibers, the second carbon nanofibers can be more uniformly dispersed in the elastomer. According to this method of producing a carbon fiber composite material, since an equal performance can be obtained using a smaller amount of second carbon nanofibers, expensive second carbon nanofibers can be saved so that the economic efficiency increases.

(V) Carbon Fiber Composite Material

The carbon fiber composite material is described below.

The carbon fiber composite material includes an elastomer, and carbon nanofibers having a surface oxygen concentration measured by X-ray photoelectron spectroscopy (XPS) of 2.6 to 4.6 atm %. The second carbon nanofibers are uniformly dispersed in the elastomer. Since the second carbon nanofibers exhibit improved wettability with the elastomer due to oxidation, the carbon fiber composite material exhibits improved rigidity and flexibility. In particular, the carbon fiber composite material exhibits improved rigidity at a high temperature.

The carbon fiber composite material in uncrosslinked form preferably has a first spin-spin relaxation time ($T2n$), measured for $^1H$ at 150° C. by the Hahn-echo method using the pulsed NMR technique, of 100 to 3000 microseconds, and a fraction (fnn) of components having a second spin-spin relaxation time of 0 to 0.2.

The first spin-spin relaxation time ($T2n$) and the fraction (fnn) of the carbon fiber composite material measured at 150° C. indicate whether or not the second carbon nanofibers are uniformly dispersed in the elastomer (matrix). When the second carbon nanofibers are uniformly dispersed in the elastomer, the elastomer is restrained by the second carbon nanofibers. The mobility of the molecules of the elastomer restrained by the second carbon nanofibers is small as compared with the case where the molecules of the elastomer are not restrained by the second carbon nanofibers. Therefore, the first spin-spin relaxation time ($T2n$), the second spin-spin relaxation time ($T2nn$), and the spin-lattice relaxation time ($T1$) of the carbon fiber composite material are shorter than those of the elastomer that does not include the second carbon nanofibers, and further decrease when the second carbon nanofibers are uniformly dispersed in the elastomer. In particular, the carbon fiber composite material according to this embodiment tends to have a first spin-spin relaxation time ($T2n$/150° C.) shorter than that of a carbon fiber composite material obtained by mixing the unoxidized first carbon nanofibers into the elastomer.

When the molecules of the elastomer are restrained by the second carbon nanofibers, the number of non-network components (non-reticulate chain components) is considered to decrease for the following reasons. Specifically, when the molecular mobility of the entire elastomer has decreased due to the second carbon nanofibers, the number of non-network components that cannot easily move increases so that the non-network components tend to behave in the same manner as the network components. Moreover, since the non-network components (terminal chains) easily move, the non-network components tend to be adsorbed on the active sites of the second carbon nanofibers. It is considered that these phenomena decrease the number of non-network components. Therefore, the fraction (fn) of components having the second spin-spin relaxation time ($T2nn$) becomes greater than that of the elastomer that does not include the second carbon nanofibers (i.e., fn+fnn=1). Accordingly, when the carbon fiber composite material has values measured by the Hahn-echo method using the pulsed NMR technique within the above ranges, the second carbon nanofibers are uniformly dispersed in the carbon fiber composite material.

EXAMPLES

The invention is further described below by way of examples. Note that the invention is not limited to the following examples.

(1) Production of Second Carbon Nanofibers (1-1) A spray nozzle was installed at the top of a vertical heating furnace (inner diameter: 17.0 cm, length: 150 cm). The inner wall temperature (reaction temperature) of the heating furnace was increased to and maintained at 1000° C. A liquid raw material (i.e., benzene containing 4 wt % of ferrocene) (20 g/min) was supplied from the spray nozzle together with hydrogen gas (100 l/min) so that the raw material was directly sprayed onto the wall of the furnace. The spray nozzle had a conical shape (trumpet shape or umbrella shape). The vertex angle of the nozzle was 60°. Ferrocene was pyrolyzed under the above conditions to produce iron particles. The iron particles served as seeds so that carbon nanofibers were produced and grown from carbon produced by pyrolysis of benzene. The carbon nanofibers were continuously produced by this method over one hour while scraping off the carbon nanofibers at intervals of five minutes.

The carbon nanofibers thus produced by the vapor growth method were heated at 2800° C. in an inert gas atmosphere to graphitize the carbon nanofibers. The graphitized (untreated) carbon nanofibers ("CNT-N" in Table 1) had an average diameter of 87 nm, an average length of 10 micrometers, a Raman peak ratio (D/G) of 0.08, a specific surface area by nitrogen adsorption of 25 m$^2$/g, and a surface oxygen concentration of 2.1 atm %.

(1-2) Second carbon nanofibers used in Examples 1 to 12 and Comparative Examples 10 and 11 were produced by placing 100 g of the graphitized first carbon nanofibers in a heating furnace ("AMF-20N" manufactured by ASH) containing air, and oxidizing the graphitized carbon nanofibers at a temperature (575 to 720° C.) and for a time (1 to 2 hours) shown in Table 1.

Figure 2:
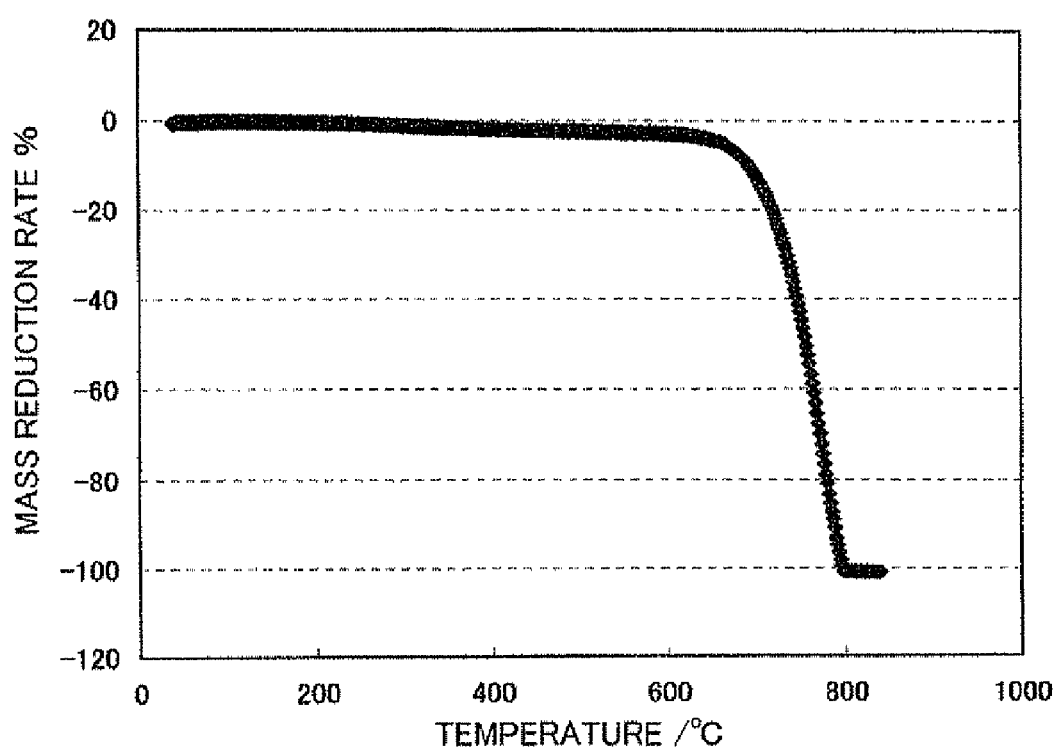
FIG. 2 is a graph illustrating a change in mass of second carbon nanofibers with respect to temperature measured by thermogravimetry (TG).

The temperature of the heating furnace was set based on the results for a reduction in mass of the first carbon nanofibers measured by thermogravimetry (TG). Specifically, a reduction in mass when increasing the temperature of the first carbon nanofibers in air was measured, and a change in mass of the second carbon nanofibers with respect to temperature was determined (see FIG. 2). The temperature rise rate was carbon nanofibers ("CNT-N") were also calculated based on the measurement results for the surface oxygen concentration of the first and second carbon nanofibers. The results are shown in Table 1. The ratio (D/G) of the peak intensity D at around 1300 cm$^{-1}$ to the peak intensity G at around 1600 cm$^{-1}$ of the second carbon nanofibers was measured by Raman scattering spectroscopy using a measuring instrument "HOLOLAB-5000" (manufactured by KAISER OPTICAL SYSTEM, 532 nm ND:YAG). The specific surface area by nitrogen adsorption (m$^2$/g) of the second carbon nanofibers was measured using a measuring instrument "NOVA 3000" (nitrogen gas) (manufactured by Yuasa-Ionics Co., Ltd.). The surface oxygen concentration of the second carbon nanofibers was measured by X-ray photoelectron spectroscopy (XPS). Specifically, the second carbon nanofibers were sprinkled over and caused to adhere to a carbon tape on a metal stage. After removing the second carbon nanofibers that did not adhere to the carbon tape, the metal stage was installed in an XPS apparatus. A microanalysis X-ray photoelectron spectroscopy apparatus "JPS-9200" (XPS apparatus) manufactured by JEOL Ltd. was used to measure the oxygen concentration. The second carbon nanofibers (powder sample) were subjected to argon gas etching (argon gas concentration: $8 \times 10^{-2}$ Pa) for 0.5 minutes so that the surface of the second carbon nanofibers was exposed. The surface oxygen concentration of the second carbon nanofibers was then measured (analysis diameter of X-ray source: 1 mm, anticathode: Al/Mg twin target, accelerating voltage: 10 kV, emission current: 30 mA). Oxygen and carbon were detected by XPS as elements of the surface of the second carbon nanofibers.

TABLE 1

| | | | | | | | |
|---|---|---|---|---|---|---|---|
| Temperature of heating furnace | ° C. | — | 575 | 615 | 650 | 690 | 720 |
| Heat treatment (holding) time in heating furnace | hour | — | 1 | 2 | 2 | 2 | 2 |
| Carbon nanofiber | | CNT-N | CNT-A | CNT-B | CNT-C | CNT-D | CNT-E |
| Mass residual rate | mass % | 100 | 99 | 97.3 | 88.9 | 83.8 | 70 |
| Raman peak ratio | (D/G) | 0.08 | 0.10 | 0.14 | 0.19 | 0.21 | 0.23 |
| Specific surface area by nitrogen adsorption | m$^2$/g | 25 | 30 | 37 | 43 | 53 | 63 |
| Oxygen concentration | atm % | 2.1 | 2.5 | 3.2 | 3.5 | 3.6 | 4.8 |
| Oxygen concentration increase amount | atm % | — | 0.4 | 1.1 | 1.4 | 1.5 | 2.7 |
| Oxygen concentration increase rate | % | — | 19% | 52% | 67% | 71% | 129% |

10° C./min, and the atmosphere was air (compressed air (200 ml/min)). The heating furnace was set to a temperature shown in Table 1 within the range from 600° C. (at which the mass of the first carbon nanofibers started to decrease (i.e., the first carbon nanofibers were oxidized) to 800° C. (at which a reduction in mass of the first carbon nanofibers was 100% (the first carbon nanofibers were burned out) to obtain five types of second carbon nanofibers. In Table 1, these second carbon nanofibers are indicated by "CNT-A (575° C.)", "CNT-B (615° C.)", "CNT-C (650° C.)", "CNT-D (690° C.)", and "CNT-E (720° C.)" (the temperature in parenthesis indicates the temperature of the heating furnace). The actual temperature inside the heating furnace was ±30° C. with respect to the set temperature.

Figure 3:
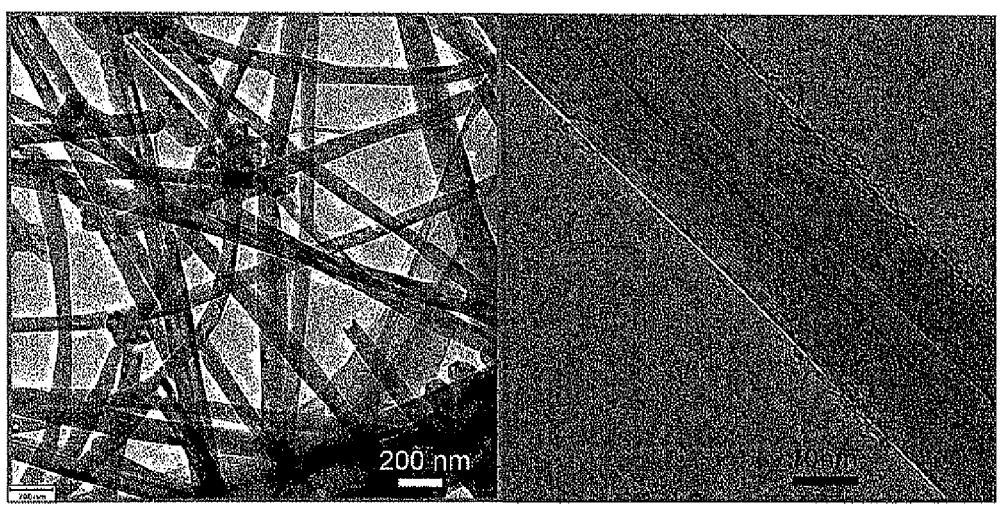
FIG. 3 is an electron micrograph of first carbon nanofibers (CNT-N) used in Comparative Examples 2 to 5.
Figure 4:
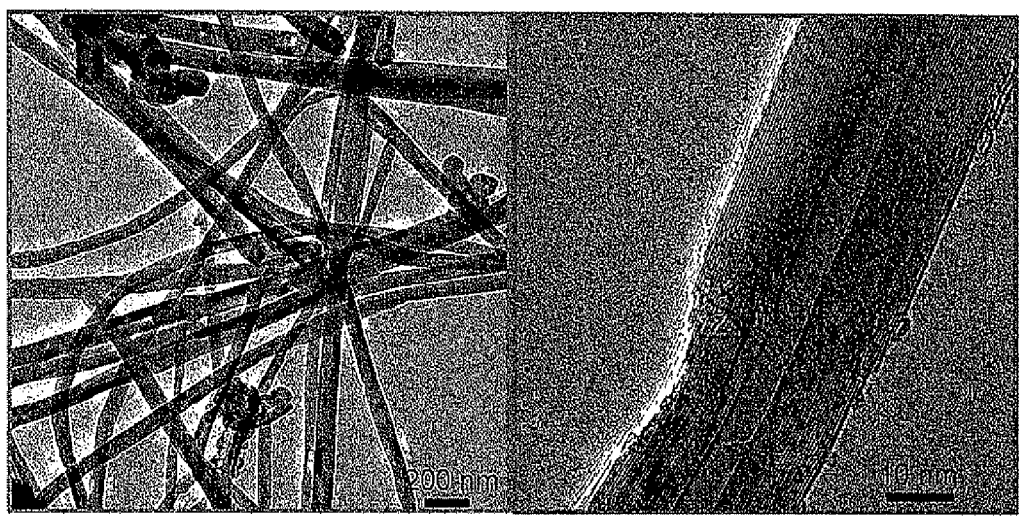
FIG. 4 is an electron micrograph of second carbon nanofibers (CNT-B) used in Examples 1 to 4.
Figure 5:
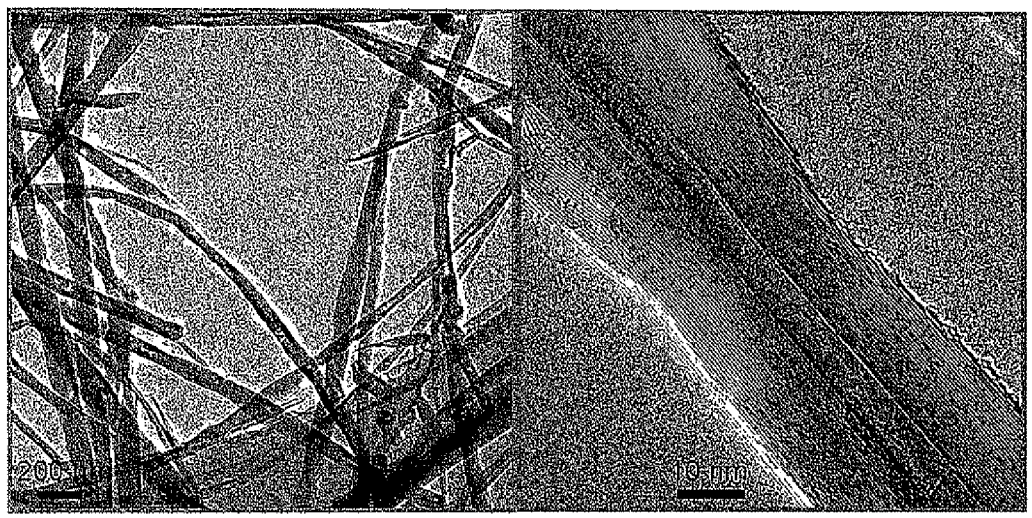
FIG. 5 is an electron micrograph of second carbon nanofibers (CNT-C) used in Examples 5 to 8.
Figure 6:
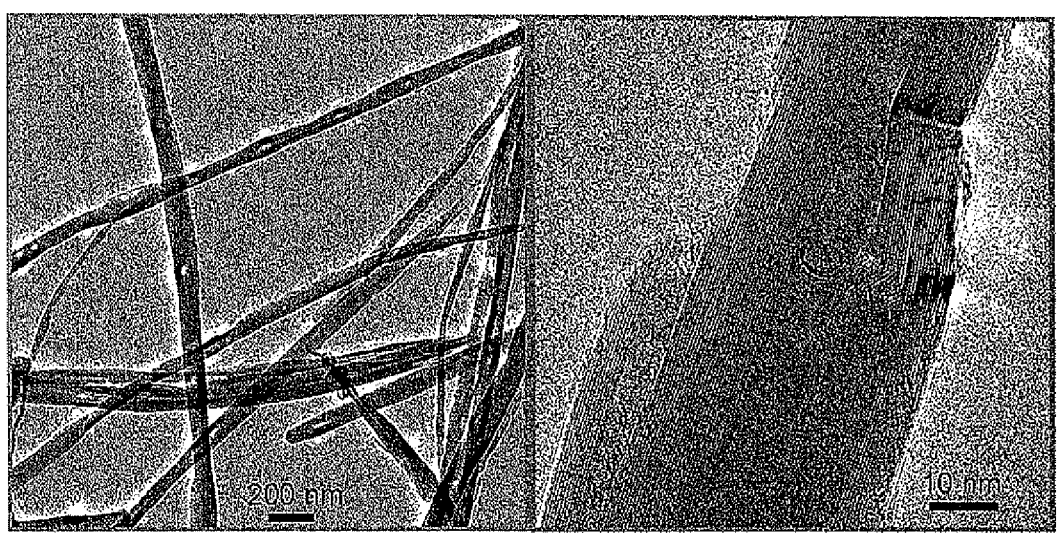
FIG. 6 is an electron micrograph of second carbon nanofibers (CNT-D) used in Examples 9 to 12.

The Raman peak ratio (D/G), the specific surface area by nitrogen adsorption, and the surface oxygen concentration of the five types of second carbon nanofibers were measured. The results are shown in Table 1. An increase amount (c=b−a) and an increase rate (d=100·c/a) of the surface oxygen concentration (b) of the second carbon nanofibers with respect to the surface oxygen concentration (a) of the unoxidized first The carbon nanofibers were photographed using an electron microscope. FIG. 3 shows an electron micrograph of the first carbon nanofibers "CNT-N", and FIGS. 4 to 6 show electron micrographs of the second carbon nanofibers "CNT-B", "CNT-C", and "CNT-D", respectively. The surface of the second carbon nanofibers shown in FIGS. 4 to 6 is moderately roughened (oxidized) (i.e., the second carbon nanofibers shown in FIGS. 4 to 6 are considered to exhibit improved wettability with an elastomer) as compared with the surface of the first carbon nanofibers "CNT-N" shown in FIG. 3.

(2) Production of Carbon Fiber Composite Material Samples of Examples 1 to 12 and Comparative Examples 1 to 11

Samples of Examples 1 to 12 and Comparative Examples 1 to 11 were produced as follows. An ethylene-propylene rubber in an amount shown in Table 1 was supplied to an open roll (roll temperature: 20° C.). After the addition of the carbon nanofibers, the mixture was masticated, subjected to a first mixing step, and removed from the roll. The mixture was again supplied to the open roll (roll temperature: 100° C.), subjected to a second mixing step, and removed from the roll.

The mixture was wound around the open roll (roll temperature: 10 to 20° C., roll distance: 0.3 mm), and tight-milled 5 times. The surface velocity ratio of the rolls was set to 1.1. After setting the roll distance to 1.1 mm, the carbon fiber composite material obtained by tight milling was supplied to the open roll, and sheeted.

The resulting sheet was compression-molded at 90° C. for 5 minutes to obtain uncrosslinked carbon fiber composite material samples (thickness: 1 mm) of Examples 1 to 12 and Comparative Examples 1 to 11. Separately, 2 parts by mass (phr) of a peroxide was mixed into the uncrosslinked carbon fiber composite material obtained by tight milling. The mixture was supplied to the open roll (roll distance: 1.1 mm), and sheeted. The carbon fiber composite material that was sheeted and cut into a die size was placed in a die, and compression-molded at 175° C. and 100 kgf/cm$^2$ for 20 minutes to obtain crosslinked carbon fiber composite material samples (thickness: 1 mm) of Examples 1 to 12 and Comparative Examples 1 to 11.

In Tables 2 and 3, "HAF" indicates HAF carbon black having an average particle size of 27 nm and a specific surface area by nitrogen adsorption of 82 m$^2$/g, and "EPDM" indicates an ethylene-propylene rubber "EP103AF" (manufactured by JSR Corporation). In Tables 2 and 3, the second carbon nanofibers obtained in (1) are indicated by "CNT-A" to "CNT-E", and the unoxidized first carbon nanofibers are indicated by "CNT-N".

(3) Production of Carbon Fiber Composite Material Samples of Examples 13 and 14 and Comparative Examples 11 to 14

Samples of Examples 13 and 14 and Comparative Examples 11 to 14 were produced as follows. A fluoroelastomer in an amount shown in Table 4 was supplied to an open roll (roll temperature: 20° C.). After the addition of the carbon nanofibers, the mixture was masticated, and removed from the roll. The mixture was wound around the open roll (roll temperature: 10 to 20° C., roll distance: 0.3 mm), and tight-milled ten times. The surface velocity ratio of the rolls was set to 1.1. After setting the roll distance to 1.1 mm, the carbon fiber composite material obtained by tight milling was supplied to the open roll, and sheeted.

The resulting sheet was compression-molded to obtain uncrosslinked carbon fiber composite material samples (thickness: 1 mm) of Examples 13 and 14 and Comparative Examples 11 to 14. After rolling the uncrosslinked carbon fiber composite material, the carbon fiber composite material was pressed (cured) at 170° C. for 10 minutes. The cured carbon fiber composite material was post-cured at 200° C. for 24 hours to obtain crosslinked carbon fiber composite materials (sheet-shaped, thickness: 1 mm) of Examples 13 and 14 and Comparative Examples 11 to 14.

In Table 4, "HAF" indicates HAF carbon black having an average particle size of 27 nm and a specific surface area by nitrogen adsorption of 82 m$^2$/g, and "Binary FKM" indicates a fluoroelastomer "Viton A-500" (manufactured by DuPont Dow Elastomers Japan, molecular weight: 50,000). In Table 4, the second carbon nanofibers (temperature of heating furnace: 650° C.) obtained in (1) are indicated by "CNT-C", and the unoxidized first carbon nanofibers are indicated by "CNT-N".

(4) Measurement Using Pulsed NMR Technique

The uncrosslinked carbon fiber composite material samples of Examples 1 to 14 and Comparative Examples 1 to 14 were subjected to measurement by the Hahn-echo method using the pulsed NMR technique. A measuring instrument "JMN-MU25" (manufactured by TEOL, Ltd.) was used for the measurement. The measurement was conducted under conditions of an observing nucleus of $^1$H, a resonance frequency of 25 MHz, and a 90-degree pulse width of 2 microseconds. A decay curve was determined while changing Pi in the pulse sequence (90° x-Pi-180° x) of the Hahn-echo method. The measurement was conducted in a state in which the sample was inserted into a sample tube within an appropriate magnetic field range. The measurement temperature was 150° C. The first spin-spin relaxation time (T2$n$/150° C.) and the fraction (fnn) of components having the second spin-spin relaxation time of each sample were determined by this measurement. The measurement results are shown in Tables 2 to 4. The first spin-spin relaxation times (T2$n$/30° C.) of "EPDM" and "Binary FKM" measured in the same manner as described above were 520 microseconds and 55 microseconds, respectively. Each uncrosslinked carbon fiber composite material sample was also subjected to measurement by the solid-echo method using the pulsed NMR technique. A measuring instrument "JMN-MU25" (manufactured by JEOL, Ltd.) was used for the measurement. The measurement was conducted under conditions of an observing nucleus of $^1$H, a resonance frequency of 25 MHz, and a 90-degree pulse width of 2 microseconds. A decay curve was determined in the pulse sequence (90° x-Pi-90° y) of the solid-echo method to detect the spin-spin relaxation time (T2$s$) at 150° C. of each uncrosslinked carbon fiber composite material sample.

(5) Measurement of Hardness

The rubber hardness (JIS-A) of the crosslinked carbon fiber composite material samples of Examples 1 to 14 and Comparative Examples 1 and 14 was measured in accordance with HS K 6253. The measurement results are shown in Tables 2 to 4.

(6) Measurement of 100% Modulus (M100)

Figure 7:
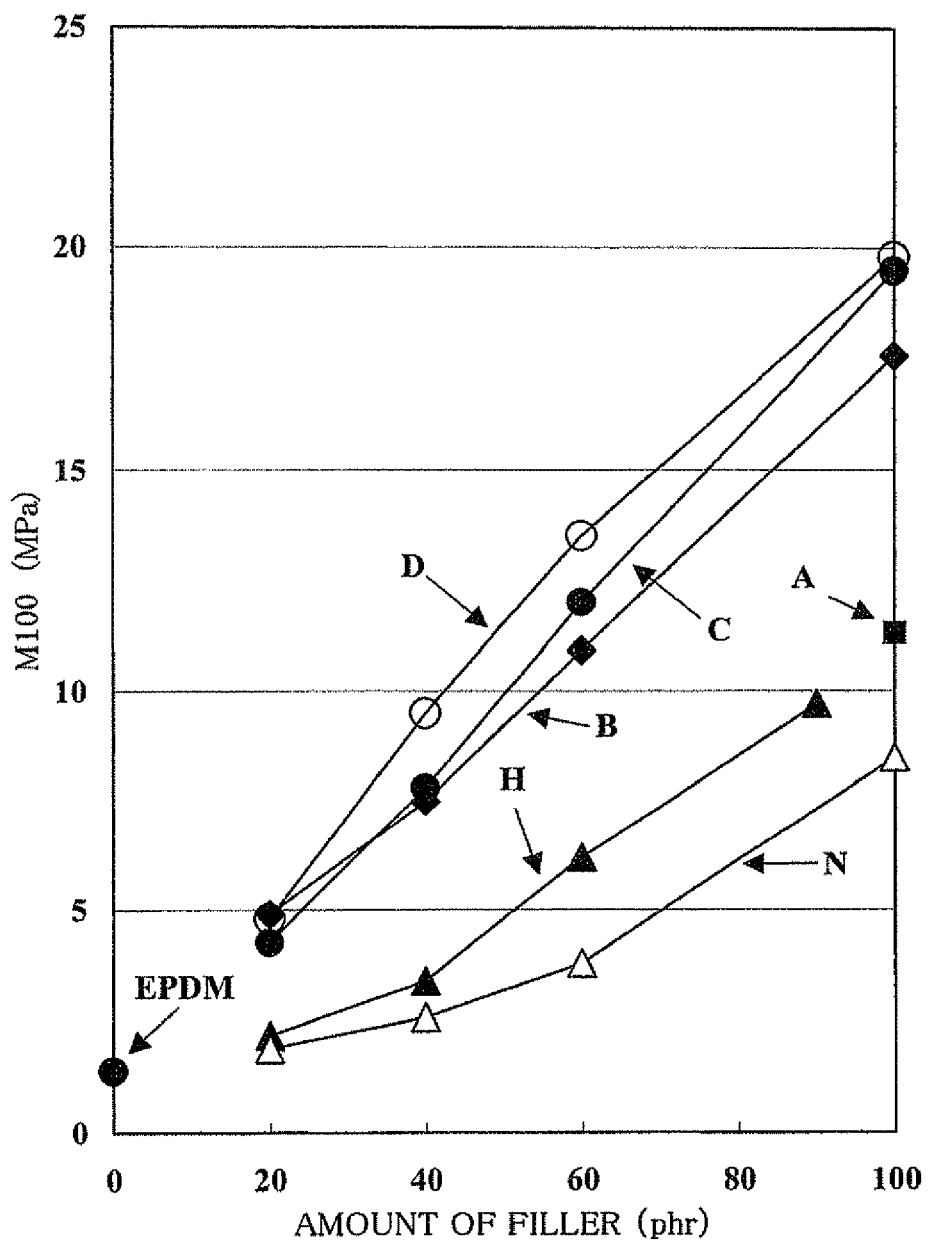
FIG. 7 is a graph illustrating the M100 with respect to the amount of filler in Examples 1 to 12 and Comparative Examples 1 to 9.

The uncrosslinked carbon fiber composite material samples (width: 5 mm, length: 50 mm, thickness: 1 mm) of Examples 1 to 14 and Comparative Examples 1 and 14 were stretched at a rate of 10 mm/min, and the stress (M100: 100% modulus (MPa)) when the sample was deformed by 100% was determined. The measurement results are shown in Tables 2 to 4. FIG. 7 illustrates the measurement result for Examples 1 to 12 and Comparative Examples 1 and 10 (i.e., a graph illustrating a change in 100% modulus (MPa) with respect to the amount (phr) of filler). In FIG. 7, A indicates "CNT-A (Comparative Example 10)", B indicates "CNT-B", C indicates "CNT-C", D indicates "CNT-D", H indicates "HAF", N indicates "CNT-N", and EPDM indicates "EPDM (Comparative Example 1)". The rate of increase in 100% modulus (M100 increase rate) of the carbon fiber composite material with respect to the 100% modulus of the elastomer per part by weight of the carbon nanofibers mixed into 100 parts by weight of the elastomer was calculated based on the measurement results. For example, the rate of increase in 100% modulus (M100 increase rate) (%) in Example 1 (12.5%) was calculated by dividing the difference in M100 between Example 1 and Comparative Example 1 (4.9−1.4=3.5) by the M100 (1.4) of Comparative Example 1, and dividing the resulting value by the amount (20) of CNT-A of Example 1.

(7) Measurement of Tensile Strength (MPa) and Elongation at Break (%)

Figure 8:
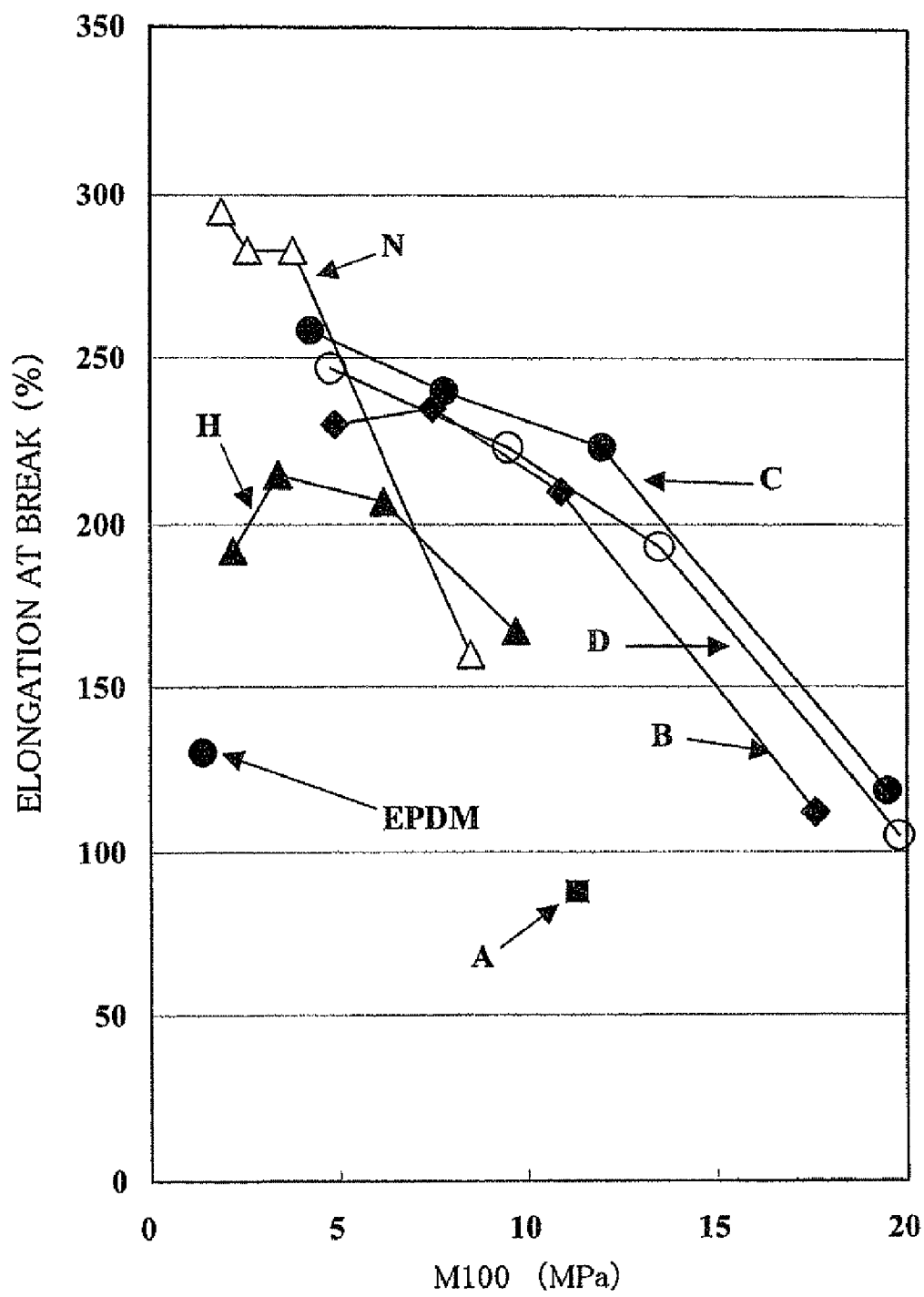
FIG. 8 is a graph illustrating the elongation at break with respect to the M100 in Examples 1 to 12 and Comparative Examples 1 to 9.

A specimen prepared by cutting each crosslinked carbon fiber composite material sample in the shape of a 1 A dumbbell was subjected to a tensile test in accordance with HS K 6251 at a temperature of 23±2° C. and a tensile rate of 500 mm/min using a tensile tester (manufactured by Toyo Seiki Seisaku-sho, Ltd.) to measure the tensile strength (MPa) and the elongation at break (%) of the specimen. The results are shown in Tables 2 to 4. FIG. 8 illustrates the measurement results for Examples 1 to 12 and Comparative Examples 1 and 9 (i.e., a graph illustrating a change in elongation at break (%) with respect to M100 (MPa)). In FIG. 8, A indicates "CNT-A (Comparative Example 10)", B indicates "CNT-B", C indicates "CNT-C", D indicates "CNT-D", H indicates "HAF", N indicates "CNT-N", and EPDM indicates "EPDM (Comparative Example 1)".

(8) Dynamic Viscoelasticity Test

Specimens were prepared by cutting the crosslinked carbon fiber composite material samples of Examples 1 to 14 and Comparative Examples 1 to 14 in the shape of a strip (40×1×5 (width) mm). Each specimen was subjected to a dynamic viscoelasticity test using a dynamic viscoelasticity tester DMS6100 (manufactured by SIT) at a chuck distance of 20 mm, a measurement temperature of −100 to 300° C., a dynamic strain of ±0.05%, and a frequency of 10 Hz in accordance with JIS K 6394 to measure the dynamic modulus of elasticity (E', MPa). Tables 2 to 4 show the measurement results for the dynamic modulus of elasticity (E') at a measurement temperature of 25° C. and 200° C. The rate of increase in dynamic modulus of elasticity (E' increase rate) of the carbon fiber composite material with respect to the dynamic modulus of elasticity of the elastomer per part by weight of the carbon nanofibers mixed into 100 parts by weight of the elastomer was calculated based on the measurement results (measurement temperature: 200° C.). For example, the rate of increase in dynamic modulus of elasticity (E' increase rate) (%) in Example 1 (14.1%) was calculated by dividing the difference in dynamic modulus of elasticity between Example 1 and Comparative Example 1 (18−4.7=13.3) by the dynamic modulus of elasticity (4.7) of Comparative Example 1, and dividing the resulting value by the amount (20) of CNT-A of Example 1.

(9) Measurement of Creep Characteristics

The crosslinked carbon fiber composite material samples of Examples 1 to 14 and Comparative Examples 1 to 14 were subjected to a creep test at a temperature of 120° C. and a load of 250 KPa to measure the creep rate (ppm/h) during a steady-state creep period (200 to 900 min). The creep rate refers to a change in strain (1 ppm=0.0001%) per hour in a steady-state creep period that occurs after the instantaneous creep strain but before an accelerating creep period ("creep rate" in Tables 2 to 4). The results are shown in Tables 2 to 4.

(10) Measurement of Average Coefficient of Linear Expansion

The average coefficient of linear expansion of the crosslinked carbon fiber composite material samples of Examples 1 to 14 and Comparative Examples 1 to 14 was measured within the measurement temperature range. The results are shown in Tables 2 to 4. An instrument "TMASS" (manufactured by SIT) was used for the measurement. The sample had dimensions of 1.5×1.0×10 mm. The applied load was 25 KPa, the measurement temperature was room temperature to 150° C., and the temperature rise rate was 2° C./min.

TABLE 2

| | | | Ex 1 | Ex 2 | Ex 3 | Ex 4 | Ex 5 | Ex 6 |
|---|---|---|---|---|---|---|---|---|
| Component | EPDM | phr | 100 | 100 | 100 | 100 | 100 | 100 |
| | CNT-B | phr | 20 | 40 | 60 | 100 | 0 | 0 |
| | CNT-C | phr | 0 | 0 | 0 | 0 | 20 | 40 |
| | CNT-D | phr | 0 | 0 | 0 | 0 | 0 | 0 |
| | Total amount of filler | phr | 20 | 40 | 60 | 100 | 20 | 40 |
| Measurement results for uncrosslinked form using pulsed NMR technique | EPDM | μsec | 520 | 520 | 520 | 520 | 520 | 520 |
| | T2n (150° C.) | μsec | 1900 | 1880 | 1770 | 1610 | 1950 | 1800 |
| | fnn (150° C.) | | 0.19 | 0.18 | 0.17 | 0.13 | 0.19 | 0.16 |
| Properties of crosslinked form | Hardness | JIS A | 76 | 82 | 87 | 91 | 75 | 83 |
| | M100 | MPa | 4.9 | 7.5 | 10.9 | 17.6 | 4.3 | 7.8 |
| | M100 increase rate | % | 12.5 | 10.9 | 11.3 | 11.6 | 10.2 | 11.4 |
| | Tensile strength | MPa | 7.3 | 10.6 | 13.9 | 17.9 | 6.5 | 10.3 |
| | Elongation at break | % | 230 | 235 | 210 | 112 | 258 | 240 |
| | E' (25° C.) | MPa | 36 | 93 | 218 | 571 | 34 | 92 |
| | E' (200° C.) | MPa | 18 | 35 | 65 | 121 | 22 | 36 |
| | E' (200° C.) increase rate | % | 14.1 | 16.1 | 21.4 | 24.7 | 18.4 | 16.6 |
| | Creep rate | ppm/hr | 69.0 | 30.0 | 12.6 | 28.6 | 104.9 | 12.8 |
| | Average coefficient of linear expansion | 1/K (ppm) | 62 | 36 | 5 | 17 | 56 | 39 |

| | | | Ex 7 | Ex 8 | Ex 9 | Ex 10 | Ex 11 | Ex 12 |
|---|---|---|---|---|---|---|---|---|
| Component | EPDM | | 100 | 100 | 100 | 100 | 100 | 100 |
| | CNT-B | | 0 | 0 | 0 | 0 | 0 | 0 |
| | CNT-C | | 60 | 100 | 0 | 0 | 0 | 0 |
| | CNT-D | | 0 | 0 | 20 | 40 | 60 | 100 |
| | Total amount of filler | | 60 | 100 | 20 | 40 | 60 | 100 |
| Measurement results for uncrosslinked form using pulsed NMR technique | EPDM | | 520 | 520 | 520 | 520 | 520 | 520 |
| | T2n (150° C.) | | 1580 | 1320 | 1800 | 1720 | 1660 | 1300 |
| | fnn (150° C.) | | 0.14 | 0,12 | 0.18 | 0.18 | 0.15 | 0.11 |
| Properties of crosslinked form | Hardness | | 88 | 92 | 75 | 81 | 86 | 91 |
| | M100 | | 12.0 | 19.5 | 4.8 | 9.5 | 13.5 | 19.8 |
| | M100 increase rate | | 12.6 | 12.9 | 12.1 | 14.5 | 14.4 | 13.1 |
| | Tensile strength | | 15.3 | 20.4 | 7.5 | 13.1 | 16.1 | 20.7 |
| | Elongation at break | | 223 | 118 | 247 | 223 | 193 | 105 |
| | E' (25° C.) | | 220 | 474 | 21 | 71 | 202 | 522 |
| | E' (200° C.) | | 67 | 97 | 17 | 39 | 67 | 97 |
| | E' (200° C.) increase rate | | 22.1 | 19.6 | 13.1 | 18.2 | 22.1 | 19.6 |
| | Creep rate | | 54.1 | −39.7 | 78.0 | 63.0 | −5.4 | −0.7 |
| | Average coefficient of linear expansion | | 12 | 9 | 67 | 40 | 19 | 44 |

Ex: Example

TABLE 3

|  |  |  | CE 1 | CE 2 | CE 3 | CE 4 | CE 5 | CE 6 |
|---|---|---|---|---|---|---|---|---|
| Component | EPDM | phr | 100 | 100 | 100 | 100 | 100 | 100 |
|  | HAF | phr | 0 | 0 | 0 | 0 | 0 | 20 |
|  | CNT-N | phr | 0 | 20 | 40 | 60 | 100 | 0 |
|  | CNT-A | phr | 0 | 0 | 0 | 0 | 0 | 0 |
|  | CNT-E | phr | 0 | 0 | 0 | 0 | 0 | 0 |
|  | Total amount of filler | phr | 0 | 20 | 40 | 60 | 100 | 20 |
| Measurement results for uncrosslinked form using pulsed NMR technique | EPDM | μsec | 520 | 520 | 520 | 520 | 520 | 520 |
|  | T2n (150° C.) | μsec | 2200 | 1970 | 2000 | 1800 | 1760 | 11000 |
|  | fnn (150° C.) |  | 0.24 | 0.30 | 0.16 | 0.20 | 0.14 | 0.45 |
| Properties of crosslinked form | Hardness | JIS A | 56 | 72 | 80 | 85 | 90 | 63 |
|  | M100 | MPa | 1.4 | 1.9 | 2.6 | 3.8 | 8.5 | 2.2 |
|  | M100 increase rate | % | — | 1.8 | 2.1 | 2.9 | 5.1 | 2.9 |
|  | Tensile strength | MPa | 1.9 | 5.5 | 7.4 | 10.8 | 13.5 | 4.6 |
|  | Elongation at break | % | 130 | 295 | 283 | 283 | 160 | 192 |
|  | E' (25° C.) | MPa | 3.6 | 27.3 | 92.5 | 205.7 | 494.0 | 4.4 |
|  | E' (200° C.) | MPa | 4.7 | 10.8 | 25.5 | 44.2 | 90 | 6.3 |
|  | E' (200° C.) increase rate | % | — | 6.5 | 11.1 | 14.0 | 18.1 | 1.7 |
|  | Creep rate | ppm/hr | Initial breakage | 7909 | 3649 | 292 | 27 | 62 |
|  | Average coefficient of linear expansion | 1/K (ppm) | 227 | 89 | 67 | 79 | 31 | 210 |

|  |  |  | CE 7 | CE 8 | CE 9 | CE 10 | CE 11 |
|---|---|---|---|---|---|---|---|
| Component | EPDM |  | 100 | 100 | 100 | 100 | 100 |
|  | HAF |  | 40 | 60 | 100 | 0 | 0 |
|  | CNT-N |  | 0 | 0 | 0 | 0 | 0 |
|  | CNT-A |  | 0 | 0 | 0 | 100 | 0 |
|  | CNT-E |  | 0 | 0 | 0 | 0 | 100 |
|  | Total amount of filler |  | 40 | 60 | 100 | 100 | 100 |
| Measurement results for uncrosslinked form using pulsed NMR technique | EPDM | μsec | 520 | 520 | 520 | 520 | 520 |
|  | T2n (150° C.) | μsec | 9500 | 8000 | 7300 | 2100 | 1250 |
|  | fnn (150° C.) |  | 0.42 | 0.38 | 0.35 | 0.21 | 0.10 |
| Properties of crosslinked form | Hardness |  | 68 | 73 | 83 | 92 | 92 |
|  | M100 |  | 3.4 | 6.2 | 9.7 | 11.3 | — |
|  | M100 increase rate |  | 3.6 | 5.7 | 5.9 | 7.1 | — |
|  | Tensile strength |  | 16.8 | 26.3 | 22.6 | 11.9 | 18.2 |
|  | Elongation at break |  | 215 | 207 | 167 | 183 | 88 |
|  | E' (25° C.) |  | 7.7 | 17.0 | 39.0 | 483.0 | 405.0 |
|  | E' (200° C.) |  | 10.3 | 15 | 13 | 83 | 71 |
|  | E' (200° C.) increase rate |  | 3.0 | 3.7 | 1.8 | 16.7 | 14.1 |
|  | Creep rate |  | 84 | 114 | 139 | 14 | 3 |
|  | Average coefficient of linear expansion |  | 150 | 163 | 178 | 28 | 52 |

CE: Comparative Example

TABLE 4

|  |  |  | Example 13 | Example 14 | Comparative Example 12 | Comparative Example 13 | Comparative Example 14 |
|---|---|---|---|---|---|---|---|
| Component | Binary FKM | phr | 100 | 100 | 100 | 100 | 100 |
|  | CNT-C | phr | 5 | 36 | 0 | 0 | 0 |
|  | CNT-N | phr | 0 | 0 | 0 | 0 | 5 |
|  | HAF | phr | 0 | 0 | 0 | 5 | 0 |
|  | Total amount of filler | phr | 5 | 36 | 0 | 5 | 5 |
| Measurement results for uncrosslinked form using pulsed NMR technique | Binary FKM | μsec | 50 | 50 | 50 | 50 | 50 |
|  | T2n (150° C.) | μsec | 920 | 860 | 1000 | 1000 | 870 |
|  | fnn (150° C.) |  | 0.08 | 0 | 0.333 | 0.32 | 0.18 |
| Properties of crosslinked form | Hardness | JIS A | 74 | 83 | 57 | 63 | 75 |
|  | M100 | MPa | 4.6 | 11.3 | 1.2 | 1.7 | 3.7 |
|  | M100 increase rate | % | 56.7 | 23.4 | — | 8.3 | 41.7 |
|  | Tensile strength | MPa | 18.2 | 19.9 | 10 | 20.3 | 18 |
|  | Elongation at break | % | 342 | 307 | 403 | 323 | 365 |
|  | E' (25° C.) | MPa | 24 | 72 | 3.5 | 4.4 | 28 |
|  | E' (200° C.) | MPa | 17 | 34 | 3.5 | 5.2 | 20 |
|  | E' (200° C.) increase rate | % | 77.1 | 24.2 | — | 9.7 | 94.3 |
|  | Average coefficient of linear expansion | 1/K (ppm) | 144 | 104 | 266 | 332 | 125 |

From the results shown in Tables 2 to 4, the following were confirmed for Examples 1 to 14 according to the invention. Specifically, the crosslinked carbon fiber composite material samples of Examples 1 to 14 produced using the carbon nanofibers having a moderately oxidized surface had an M100 increase rate and an E' increase rate higher than those of Comparative Examples 1 to 14. It was thus confirmed that the wettability of the carbon nanofibers with the elastomer was improved so that rigidity (particularly rigidity at a high temperature) was improved. As shown in FIGS. 7 and 8, the crosslinked carbon fiber composite material samples of Examples 1 to 12 had an M100 and an elongation at break higher than those of the carbon fiber composite material sample of Comparative Examples 1 to 9. It was thus confirmed that the crosslinked carbon fiber composite material samples of Examples 1 to 12 had rigidity and flexibility in combination. The uncrosslinked carbon fiber composite material samples of Examples 1 to 14 had a spin-spin relaxation time (T2$s$/150° C.) shorter than that of the carbon fiber composite material samples of Comparative Examples 2 to 5, 10, 11, 13, and 14 containing an identical amount of carbon nanofibers, and had a fraction (fan) lower than that of the carbon fiber composite material samples of Comparative Examples 2 to 5, 10, 11, 13, and 14. In Comparative Example 10, since the surface of the second carbon nanofibers was insufficiently oxidized, properties almost the same as those of the carbon fiber composite material of Comparative Example 5 using the first carbon nanofibers were obtained. In Comparative Example 11, since the surface of the second carbon nanofibers was damaged to a large extent due to the heat treatment, the M100, the tensile strength, and the elongation at break decreased.

| REFERENCE SIGNS LIST | |
|---|---|
| 10 | First roll |
| 20 | Second roll |
| 30 | Elastomer |
| 36 | Mixture |
| 40 | Second carbon nanofiber |
| 50 | Carbon fiber composite material |
| d | Roll distance |
| V1 | Surface velocity of first roll |
| V2 | Surface velocity of second roll |

The invention claimed is:

1. A method of producing a carbon fiber composite material comprising:
   providing first carbon nanofibers produced by a vapor growth method;
   oxidizing the first carbon nanofibers and reducing the mass of the first carbon nanofibers by 2 to 20% to obtain second carbon nanofibers having an oxidized surface, the second carbon nanofibers having a surface oxygen concentration measured by X-ray photoelectron spectroscopy (XPS) of 2.6 to 4.6 atm %; and
   mixing the second carbon nanofibers into an elastomer, and uniformly dispersing the second carbon nanofibers in the elastomer by applying a shear force to obtain a carbon fiber composite material.

2. The method of producing a carbon fiber composite material according to claim 1, wherein the surface oxygen concentration of the second carbon nanofibers measured by X-ray photoelectron spectroscopy (XPS) is higher than that of the first carbon nanofibers by 0.5 to 2.6 atm %.

3. The method of producing a carbon fiber composite material according to claim 1, wherein the surface oxygen concentration of the second carbon nanofibers measured by X-ray photoelectron spectroscopy (XPS) is higher than that of the first carbon nanofibers by 20 to 120%.

4. The method of producing a carbon fiber composite material according to claim 1, wherein the oxidizing step includes heating the first carbon nanofibers at 600 to 800° C. in an oxygen-containing atmosphere.

5. A method of producing a carbon fiber composite material comprising:
   providing first carbon nanofibers produced by a vapor growth method;
   oxidizing the first carbon nanofibers and reducing the mass of the first carbon nanofibers by 2 to 20% to obtain second carbon nanofibers having an oxidized surface, the second carbon nanofibers having a surface oxygen concentration measured by X-ray photoelectron spectroscopy (XPS) of 2.6 to 4.6 atm % and the second carbon nanofibers having a ratio (D/G) of a peak intensity D at around 1300 cm$^{-1}$ to a peak intensity G at around 1600 cm$^{-1}$ measured by Raman scattering spectroscopy of 0.12 to 0.22; and
   mixing the second carbon nanofibers into an elastomer, and uniformly dispersing the second carbon nanofibers in the elastomer by applying a shear force to obtain a carbon fiber composite material.

6. A method of producing a carbon fiber composite material comprising:
   providing first carbon nanofibers produced by a vapor growth method;
   oxidizing the first carbon nanofibers to obtain second carbon nanofibers having an oxidized surface, the second carbon an having a surface oxygen concentration measured by X-ray photoelectron spectroscopy (XPS) of 2.6 to 4.6 atm % and the second carbon nanofibers having a specific surface area by nitrogen adsorption of 34 to 58 m$^2$/g; and
   mixing the second carbon nanofibers into an elastomer, and uniformly dispersing the second carbon nanofibers in the elastomer by applying a shear force to obtain a carbon fiber composite material.

7. The method of producing a carbon fiber composite material according to claim 1, wherein the first carbon nanofibers have an average diameter of 4 to 250 nm.

* * * * *